Aug. 14, 1928.
G. E. McDONNELL
1,681,126
PIPE FLANGE TOOL
Filed June 26, 1926
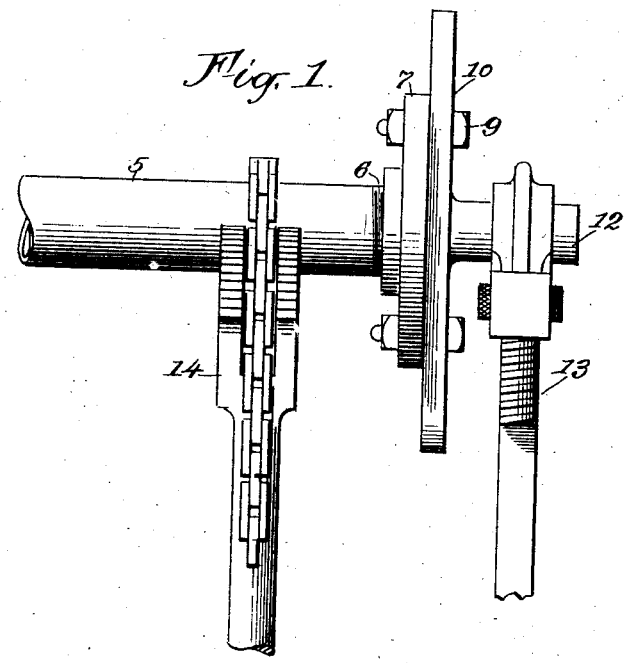
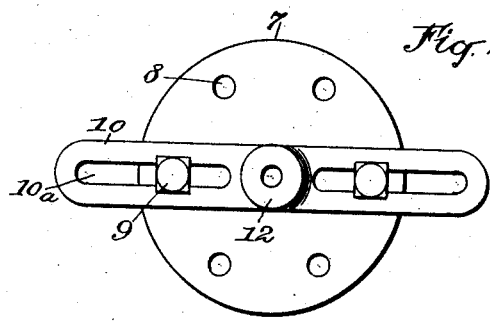
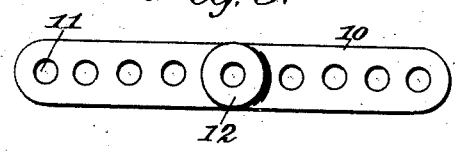
Inventor
George E. McDonnell
By J. M. St. John
Attorney Patented Aug. 14, 1928.

1,681,126

UNITED STATES PATENT OFFICE.

GEORGE E. McDONNELL, OF CEDAR RAPIDS, IOWA, ASSIGNOR OF ONE-HALF TO THOMAS F. McDONNELL, OF CEDAR RAPIDS, IOWA.

PIPE-FLANGE TOOL.

Application filed June 26, 1926. Serial No. 118,801.

This invention relates to appliances used in pipe fitting, and has for its object to provide a tool by means of which flat flanges may be easily screwed on or off of gas, water and steam pipes.

As is well known, the flanges by which pipes, especially large sized ones, are connected together, or to other apparatus, are simple flat disks, with very short hubs, or bosses, threaded to receive the pipe. There is, so far as I am aware, no tool well adapted to hold the flange in making the joint, or in the always more difficult operation of unscrewing an old flange. A special chain pipe-wrench is sometimes used for the purpose, but it is very apt to slip off the edge of the flange when the operator is straining the hardest, and give him a bad fall, with skinned hands, or broken bones. This invention supplies a tool whereby the operation is performed with the same facility that is had in connecting and disconnecting pipe with couplings, elbows, and other regular pipe fittings.

In the accompanying drawing, forming a part of this specification, Fig. 1 is a plan view showing the tool as applied to a pipe flange, and with pipe-wrenches as in position to unscrew the same. Fig. 2 shows an end elevation of the tool and an attached flange. Fig. 3 is a similar view of a modified form of the tool detached.

In the drawing, the numeral 5 denotes a pipe, threaded at 6 to receive a flange 7. This is provided with the usual bolt-holes 8 whereby it may be bolted to another part. To the outer face of the flange is bolted at 9 the flange-holder which is the subject matter of this invention. This is a very simple device, and comprises a flat bar 10, slotted at 10ª, as in Fig. 2, or provided with holes 11, as in Fig. 3 to receive a pair of fastening bolts 9. From the middle of the bar projects a hub 12, which is preferably cylindrical, the better to adapt it to the use of the tool most commonly applied to it, a pipe-wrench 13, of the well-known "Stillson" type. The hole in the hub is not important, except to lighten the casting.

In Fig. 1 the parts are duly set for the removal of the flange, which is first bolted to the holder or driver as shown. To the large pipe is applied a chain wrench, and to the smaller hub of the driver an ordinary pipe-wrench. The flange may now be unscrewed like any other pipe-fitting, and with no danger of slippage, or other accident.

If made heavy enough the driver may be made of ordinary cast iron, but to avoid possible breakage, and to give adequate strength in a lighter tool, it is preferably a drop-forging or a steel casting.

In practice the cross-bar is made long enough to span any flange within its capacity to screw or unscrew, with multiple bolt-holes or slots to accommodate it to smaller sizes. For a group of larger flanges the tool is of course made heavier and stronger.

Having thus described my invention, I claim:—

1. A pipe-flange driver, comprising a bar pierced for fastening bolts, and adapted for bolting to flanges of varying diameters, and a hub to be gripped by a pipe-wrench projecting midway from said bar.

2. A pipe-flange driver, comprising a bar provided with openings for receiving fastening bolts, and adapted to be bolted to flanges of varying diameters, and a hub projecting from said bar and within the area of the openings in the bar for the fastening bolts.

In testimony whereof I affix my signature.

GEORGE E. McDONNELL.